July 27, 1965 R. R. RIESZ 3,197,560
FREQUENCY MEASURING SYSTEM
Filed Dec. 29, 1944 2 Sheets-Sheet 1
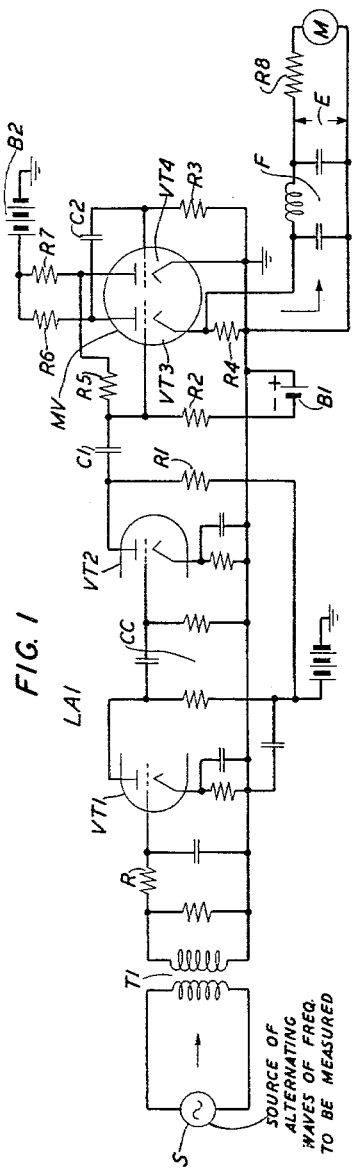
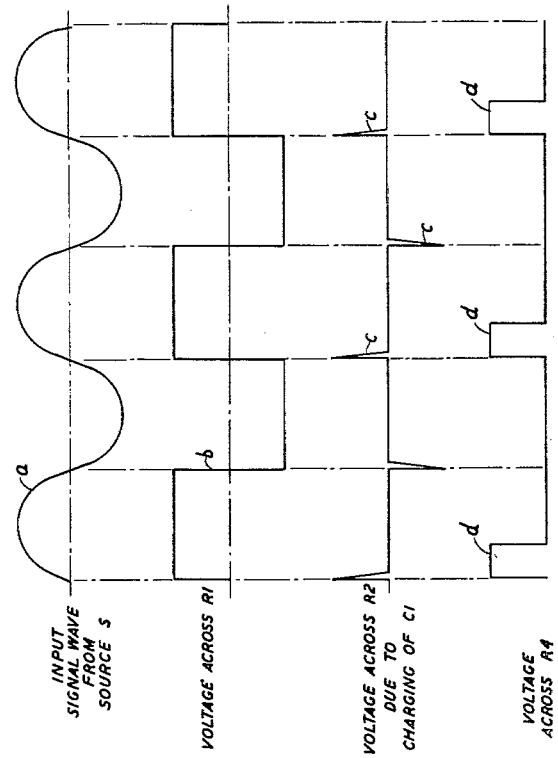
INVENTOR
R. R. RIESZ
BY
Earl C. Laughlin
ATTORNEY

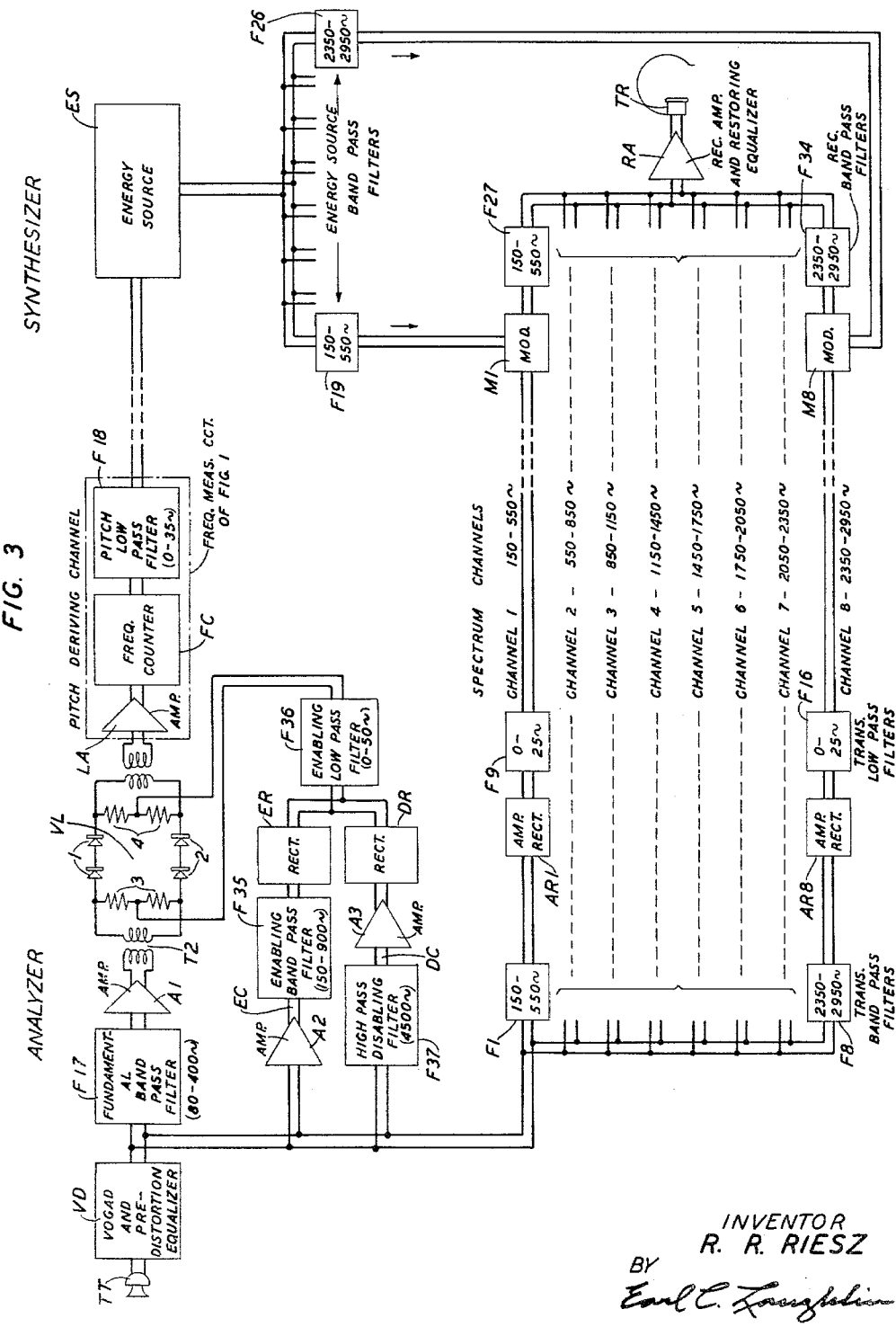

United States Patent Office 3,197,560
Patented July 27, 1965

3,197,560
FREQUENCY MEASURING SYSTEM
Robert R. Riesz, Chatham, N.J., assignor to Bell Telephone Laboratories, Incorporated, New York, N.Y., a corporation of New York
Filed Dec. 29, 1944, Ser. No. 570,407
3 Claims. (Cl. 179—1)

The invention relates to a frequency response device and particularly to a frequency measuring or pulse counting circuit and its application to a system for analyzing and synthesizing speech.

An object of the invention is to provide a precise measurement of the frequency of electrical oscillations, for example, of the fundamental frequency of a repeated electric signal wave, such as a speech wave.

A related object is to produce a direct current voltage which is proportional to the frequency of an alternating signal wave over a wide range of frequencies.

Other objects are to derive a slowly varying direct current signal from a speech wave, the magnitude of which is proportional to the fundamental pitch of the speaker's voice; and to properly control the operation of a frequency measuring circuit or counter in the pitch control channel of a speech analyzing and synthesizing system of the vocoder type.

In accordance with the invention these objects are attained efficiently by a simple and economical circuit arrangement employing a single-trip vacuum tube multivibrator of novel design, which is triggered by sharp voltage pulses produced by transmitting a wave of the frequency to be measured through a limiting amplifier and a condenser-resistance circuit of very small time constant, adapted to produce a direct current output the average value of which is linearly proportional to the frequency of the input wave over a wide frequency range and which is substantially unaffected by changes in the amplitude and shape of that wave.

A feature of the invention is a control circuit for the frequency measuring circuit or counter in the pitch control channel of a vocoder system, which discriminates between voiced and certain unvoiced sounds, and acts as a control on the time of derivation of the pitch signal.

The various features and objects of the circuits of the invention will be better understood from the following detailed description when read in conjunction with the accompanying drawings in which:

FIG. 1 shows schematically a frequency measuring or pulse counting circuit embodying the invention;

FIG. 2 shows curves used to explain the operation of the circuit of FIG. 1; and

FIG. 3 shows schematically a speech analyzing and synthesizing system of the type known as a "vocoder" employing a pitch deriving channel and a control therefor embodying the invention.

In the circuit of FIG. 1, an alternating signal wave of the frequency to be measured, such as a speech wave, which may be of fundamental sine wave form such as shown by the idealized curve $a$ of FIG. 2, received from a source S is impressed through input transformer T1 on the input of a limiting amplifier LA1 of well-known type. As shown, this amplifier comprises two three-electrode amplifying vacuum tube stages VT1 and VT2, which may be contained in a single envelope, coupled in cascade through a resistance-condenser coupling circuit CC, the first stage VT1 including a large resistance R in series with its grid circuit, for providing a desired amount of amplification determined by the selected circuit constants, and for effectively removing amplitude variations from the applied signal wave by cutting off its positive and negative voltage peaks. With a sufficiently high input signal level this result could be produced with a single amplifying stage. The wave produced across the resistance R1 in the plate circuit of the second stage VT2 of the limiting amplifier is of square or rectangular shape such as is shown by idealized curve $b$ of FIG. 2.

The square-shaped wave in the output of the limiting amplifier LA1 is transmitted through a circuit comprising the condenser C1 and the resistance R2 in series, the values of which are selected to provide a very small time constant. This, in effect, develops a voltage across the resistance R2 of that circuit which is the derivative of the applied square-shaped wave and contains in successive half cycles a very sharp positive and a negative voltage peak or spike due to the charging and discharging currents to C1 through R2. This peaked voltage wave shown by idealized curve $c$ of FIG. 2, is utilized for triggering off a single-trip multivibrator MV operating in combination with the meter M and the low pass filter F in its direct current output circuit as a frequency or pulse counter.

The multivibrator MV includes the two three-electrode amplifying vacuum tubes VT3 and VT4, which may be contained in a single envelope as shown. The anode or plate of the tube VT3 is coupled to the control grid of the tube VT4 is connected to the control grid of the tube VT3 through the resistor R5. The control grid of the tube VT3 is connected to a point between the condenser C1 and the resistance R2 in the preceding condenser-resistor circuit of small time constant. The cathodes of the tubes VT3 and VT4 may be heated to incandescence from any suitable source (not shown), which may be a direct current battery. The control grid-cathode circuit of the tube VT3 comprises the resistor R4 connected between its cathode and ground, the negative grid biasing battery B1 and the resistance R2 in series. The control grid of the tube VT4 is connected to the cathode of that tube through the series resistor R3. Plate current is supplied from the common plate battery B2 in parallel to the anodes of the tubes VT3 and VT4 through the individual equivalent resistances R6 and R7, respectively. The meter M, which may be an ammeter, is connected across the cathode resistor R4 of the multivibrator tube VT3 through the large (20,000 ohms) series resistor R8 and the low-pass filter F having a cut-off at a frequency of, say, 35 cycles per second.

With no signal input to the multivibrator MV from the resistance-condenser circuit C1–R2, the tube VT3 is biased to cut-off by the negative bias voltage supplied by grid battery B1. Since the anode voltage of the tube VT3 is high for this condition, the condenser C2 connected between the plate of that tube and the grid of the tube VT4, is charged positively with respect to ground by plate battery B2 through resistance R6. Also, with no signal input to the multivibrator MV, the control grid of the tube VT4 has zero bias so that this tube is in the conducting condition and its anode voltage is low. For that condition, the positive voltage drop developed across resistance R2 is small.

When a sharp positive voltage peak is produced across the resistance R2, the positive voltage applied to the grid of the multivibrator tube VT3 will be sufficiently large to overcome the negative bias voltage supplied by battery B1 and that tube will suddenly become conducting. This will abruptly reduce the anode voltage of tube VT3, which in turn, will cause the condenser C2 (which was positively charged from battery B2) to discharge through the circuit comprising the resistances R3 and R4 and the discharge path of the tube VT3 in series. The resulting negative voltage produced across the resistance R3 in the grid circuit of the tube VT4 will be impressed on the grid of that tube driving it beyond cut-off. The resulting increase in the anode voltage of tube VT4 will cause a positive voltage to appear across the resistance R2 due to its connection to the anode of that tube through resistance R5. This positive voltage across resistance R2 applied to the control grid of tube VT3 will maintain that tube in a conducting condition as long as the tube VT4 is non-conducting, even though the positive voltage pulse across the resistance R2 due to the charging of the condenser C1, is no longer present. After the elapse of a certain time interval determined by the time constant $(R3+R4)$ and C2, the negative voltage across RF3 will have been reduced to the point that tube VT4 again becomes conducting. The resultant reduction in its anode voltage will reduce the positive voltage across the resistance R2 and thus the positive potential on the grid of the tube VT3 so that the latter tube abruptly becomes non-conducting, and the resulting increase in its anode voltage will allow condenser C2 to be again positively charged with respect to ground through resistance R6 from plate battery B2. The multivibrator MV is thus returned to its normal unoperated condition and will remain in that condition until another positive voltage peak in response to the input signal wave appears across the resistance R2, when the cycle of operations just described will be repeated.

During the time that the tube VT3 is maintained in the conducting condition which, as stated above, will be as long as the tube VT4 is maintained non-conducting in response to the application of a positive triggering pulse to the multivibrator input, a voltage of substantially constant value will appear across the cathode resistor R4. This means that once per cycle of the input wave a positive voltage pulse of substantially constant amplitude and duration (width) will appear across the resistor R4, the duration of the pulse being determined by the time constant of the resistances R3 and R4 and the condenser C2. The shape of this pulse will not be affected by variation in the amplitude and shape of the input signal wave. The shape of the voltage wave produced across the cathode resistor R4 of the multivibrator MV is shown by the idealized curve $d$ of FIG. 2. The average value of the direct current component of the voltage across the cathode-resistor R4 will increase linearly with input frequency up to such a maximum frequency that the interval between the positive and negative voltage pulses appearing across the resistance R2 in response to the applied square wave, is equal to the duration of the voltage pulse across the resistance R4. Further increase in input frequency will not result in an increase in output voltage.

The voltage thus produced across the cathode resistor R4 will cause pulses of current to be transmitted through the low-pass filter F to the meter M, the function of the low-pass filter being to effectively remove instantaneous variations or ripples in that current. To accomplish this, the cut-off frequency of the filter is properly selected with respect to the frequency of the input wave. The deflection of the meter M will be a function of the average current applied to it, and thus will be directly proportional to the frequency of the speech wave applied to the input of the frequency measuring circuit.

Among the practical advantages of the frequency measuring circuit of the invention as described above are the following:

(1) Accurate frequency measurement is attained with a simple circuit arrangement and a relatively small amount of transmission apparatus;

(2) The average value of the output voltage is proportional to the input frequency over a wide frequency range;

(3) A high efficiency is obtained due to the square shape of the control wave applied to the multivibrator;

(4) No rectifier stage is necessary;

(5) The circuit will start to measure properly at a very sharp threshold value of input level; and (6) The use of the external bias voltage and single cathode resistor in the multivibrator enables the negative side of the output to be on ground with no current flowing, when no signal is applied.

FIG. 3 shows a "vocoder" system of the general type disclosed in my U.S. Patent No. 2,183,248, issued December 12, 1939, or in the Dudley Patents No. 2,151,091, issued March 21, 1939, and No. 2,243,527, issued May 27, 1941, which may be utilized for analysis and synthesis of speech or other vocal sounds, frequency range reduction and restoration or for other purposes as set forth in the patent specifications, employing a pitch deriving channel and control therefor embodying the invention.

In FIG. 3, the analyzer at the transmitting end of the system is shown on the left and the synthesizer at the receiving end of the system on the right.

The analyzer includes a telephone transmitter or microphone TT for transforming applied speech sounds into an electrical wave comprising a continuous band of speech frequencies, say, of the frequency range, 0–3000 cycles per second. The electrical output of the transmitter TT is amplified and adjusted to a constant volume by the vogad (voice operated gain adjusting device) VD, which may be of any of the well-known types. Equalization of the speech energy over the frequency band is preferably obtained by means of a predistortion equalizer of suitable design, which may be incorporated in the vogad amplifier. Following the vogad, the circuit branches into two main parts; the first branch connecting to the transmitting circuits of a plurality of spectrum channels, shown at the bottom of the figure, which extend through to the synthesizer at the receiving end of the system; and the second branch connecting to the pitch deriving or frequency pattern control channel, shown at the top of the figure, which extends through the energy source for the synthesizer at the receiving end of the system.

In the spectrum channels 1 to 8, the speech wave is divided by the band-pass filters F1 . . . F8 in the inputs of the individual channels into eight contiguous frequency subbands. The eight frequency subbands in the system illustrated, comprise the frequency ranges, 150–550, 550–850, 850–1150, 1150–1450, 1450–1750, 1750–2050, 2050–2350 and 2350–2950 cycles per second. The selected frequency subbands are amplified and rectified by the amplifier-rectifiers AR1 . . . AR8 in the respective channels 1 . . . 8; and the resultant direct current components in these channels are extracted by the respective low-pass filters F9 . . . F16 each passing the frequency range 0–25 cycles per second. The output of each low-pass filter F9 . . . F16 is a unidirectional current varying in amplitude at a syllabic rate, the values of which at any instant is a function of the energy content of the particular frequency subband of the channel with which the low-pass filter is associated. The outputs of the low-pass filters F9 . . . F16 in the transmitting circuits of the spectrum channels are transmitted to the receiving or synthesizing end of the system where they are respectively applied to the signal input terminals of the identical modulators M1 . . . M8 in the receiving spectrum circuits, corresponding to the shaping networks SN1 . . . SN2 in the individual receiving spectrum circuits of the system shown in FIG. 1 of my aforementioned patent.

The pitch deriving or frequency pattern control channel of the system of FIG. 3 consists of two main parts: (1) the pitch deriving channel proper, shown at the top of the figure; and (2) a control therefor, shown just below it at the analyzing end of the system. As shown, the pitch deriving channel proper includes in its input a band-pass filter F17, the function of which is to extract from the speech waves supplied from the output of the vogad VD the fundamental frequency of the voice, that is, the fundamental voice pitch frequency. The band-pass filter 17 should only pass a band of frequencies equal to the fundamental speech frequencies to be handled by the vocoder, which is usually considered to be about from 80 to 400 cycles per second, as indicated. Following the filter F17 is an amplifier A1 utilized to raise the amplitude of the pitch signal to the necessary value; a variable attenuator or vario-losser VL forming a part of the control for the pitch deriving channel, to be described below; and a frequency measuring circuit, including in order a limiting amplifier LA, a frequency counter FC and a 0–35-cycle low-pass filter F18 corresponding to the similar elements in the frequency measuring circuit of FIG. 1, as described above, the function of which is to convert the fundamental pitch frequency to a slowly varying direct current signal the magnitude of which is proportional to the fundamental pitch of the speaker's voice.

The pitch signal so derived is transmitted over a wire path to the receiving end of the system, where it controls the energy source ES of the synthesizer, such as is described in detail in the aforementioned patents, to produce a flat spectrum of either continuous or discrete frequency components representing the frequency patterns of the original speech signals. Appropriate frequency subbands respectively having the same frequency range as passed by the band-pass filter in a different one of the spectrum channels 1 to 8 are filtered by the energy band-pass filters F19 . . . F26, respectively, from the output of the energy source ES, and are respectively supplied as control currents to the carrier input of an appropriate one of the modulators M1 . . . M8 in the receiving circuits of the spectrum channels 1 to 8. In each channel modulator circuit, the control current produces an unbalance which allows a proper amount of energy from the synthetic speech source to be transmitted to one of the receiving bandpass filters F27 . . . F34, for the frequency band transmitted by each spectrum channel, the latter filters providing additional frequency selection. The selected frequency subbands in the outputs of the filters F27 . . . F34 are superposed in the inputs of the receiving amplifier RA to form a wave simulating the original speech wave applied to the input of the system. This wave, after amplification in the receiving amplifier RA to the desired listening level, and restoration to the correct frequency composition by means of incorporated equalization in that amplififier, is transformed into speech sounds by the telephone receiver TR.

The proper operation of the speech analyzing and synthesizing or vocoder system which has just been described requires proper control of the time when the pitch signal is to be derived and discrimination between voiced and unvoiced sounds in the signals supplied to the system by the pitch deriving channel. This control is obtained by a circuit including the vario-losser VL located in the pitch deriving channel in front of the frequency counter FC, and an enabling branch circuit EC and a disabling branch circuit DC for properly controlling the loss value of that vario-losser. The vario-losser VL comprises a short section of transmission line coupled by an input transformer T2 and an output transformer between the output of amplifier A1 and the input of the limiting amplifier LA, with the copper oxide rectifiers 1, 2 poled as indicated, in series with the respective sides of the line section, and the linear resistances 3, 4 respectively, shunted across the line section on the input and output sides of these rectifiers. The elements of this vario-losser are selected so that it has about 40 decibels more loss in the normal or non-operated condition than when an enabling voltage of about 2 volts direct current is applied across the mid-point of the shunt resistances 3 and 4 by operation of the enabling circuit EC in the manner to be described below. With this additional loss, the amount of limiting in the following limiting amplifier LA is made insufficient to operate the frequency counter FC, even though a pitch signal of normal amplitude is present in the output of the amplifier A1.

The enabling branch circuit EC for the vario-losser VL includes an amplifier A2 in its input for amplifying the applied portion of the speech wave output of the vogad VD, followed in order by the enabling band-pass filter F35 adapted to pass a frequency band between about 150 and 900 cycles per second, which is the frequency region in which the voiced sounds in speech are of maximum amplitude; the enabling rectifier ER for rectifying the speech wave components passed by the filter F35; and the enabling low-pass filter F36 passing the frequency range 0–50 cycles having its output connected across the mid-points of the shunt resistances 3 and 4 in vario-losser VL. The diabling branch circuit DC includes in its input the high-pass disabling filter F37 for transmitting all frequencies applied to its input from the output of the vogad VD, in the frequency range about 4500 cycles, which is the frequency range in which the unvoiced sounds are usually of maximum amplitude, followed by the one-way amplifier A3 and the disabling rectifier DR for amplifying and rectifying the waves transmitted by the disabling filter. The output of the disabling rectifier DR and the output of the enabling rectifier ER are applied to the input of the enabling low-pass filter F36 in opposing polarity.

The elements of the enabling circuit EC are selected so that a normal output for the enabling low-pass filter F37 of about 2 volts direct current is obtained for sustained voice sounds applied to the analyzer input, which voltage, as stated above, when applied as a bias to the vario-losser VL, is effective to change the resistance of the rectifier elements 1, 2 therein so as to remove a loss of about 40 decibels from the fundamental pitch signal deriving channel. This provides a signal amplitude at the output of the limiting amplifier LA which is sufficient to operate the frequency counter FC. In general, the voiced sounds have spectra which contain more energy in the low frequency region than in the high frequency region so that, independently of the absolute level, the output of circuit EC will for voiced sounds overcome the output of the disabling circuit DC and will apply a voltage in a direction to reduce the loss in the vario-losser VL and allow the frequency counter FC in the pitch deriving channel to operate.

On unvoiced sounds, which have nearly flat frequency spectra, the low frequency energy is the same, or less, than the high frequency energy, so that for such sounds the output of the high frequency disabling filter F37 in the disabling circuit DC will just balance or will overcome the output of the enabling band-pass filter F35 in the enabling circuit EC. In either case, the normal high loss condition of the vario-losser VL will be maintained to prevent operation of the frequency counter FC in the pitch deriving channel on such sounds.

Since it has been found that the enabling circuit EC functions best on a signal of flat speech rather than on one of predistorted speech, where the predistortion network is included in the vogad, to provide optimum results, it may be desirable to connect the input of the enabling circuit EC to the output of the gain decreaser amplifier in the vogad VD rather than to the output of the voag VD, as indicated in FIG. 3.

Various modifications of the circuits illustrated and described which are within the spirit and scope of the invention will be apparent to persons skilled in the art.

What is claimed is:

1. In combination with a pitch control channel for a speech analyzing and synthesizing system, including means for transforming speech sounds into a constant volume electrical wave comprising the same frequencies, filtering means for selecting a narrow frequency band containing the range of fundamental speech frequencies from said wave and a frequency counter for converting the selected band into a slowly varying direct current signal whose magnitude is proportional to the fundamental pitch of the speaker's voice, a circuit for controlling the time of duration of the pitch signal comprising a vario-losser in the input of said frequency counter, normally providing a loss sufficient to prevent operation of said counter in response to the applied waves, an enabling branch circuit including a filter for selecting from said constant volume electrical wave a second band of speech frequencies in the low frequency region in which the voiced sounds usually contain a greater amount of energy than do the unvoiced sounds, means for rectifying the latter selected band and for applying the rectified voltage to bias said vario-losser in such direction as to reduce its loss, a disabling branch including another filter for selecting from said constant volume electrical wave a third band of speech frequencies in the higher frequency region in which the unvoiced speech sounds have substantially constant energy and means for rectifying the selected third band and applying the rectified voltage to bias said vario-losser in such direction as to increase its loss, and means for relatively adjusting the gain of said enabling and disabling circuit branches so that for voiced sound inputs to said system the resultant bias applied to said vario-losser will be such as to reduce its loss sufficiently to enable operation of frequency counter, and for unvoiced sound inputs only to said system the resultant bias applied to said vario-losser will be such as to maintain its loss sufficiently high to prevent operation of said frequency counter.

2. The combination of claim 1, in which said filter in said enabling branch circuit is a band-pass filter passing frequencies in the range between 150 and 900 cycles per second, and said filter in said disabling branch circuit is a high-pass filter passing frequencies above 4500 cycles per second.

3. A pitch deriving circuit including means for transforming applied speech sounds of a range of frequencies into an electrical wave having the same frequencies and of substantially constant average amplitude level, filtering means for selecting from said wave a narrow frequency band containing the fundamental speech frequencies, a frequency counter supplied with the selected band, for converting that band into a slowly varying direct current the magnitude of which is proportional to the fundamental pitch of said speech sounds, a vario-losser in the input to said frequency counter for controlling the sensitivity thereof and a control circuit therefor comprising an enabling circuit branch and a disabling circuit branch, said enabling circuit branch comprising means for deriving a voltage from the speech frequencies in said electrical wave in the low frequency region in which the voiced sounds usually contain a greater amount of energy than the unvoiced sounds and for applying said voltage as a bias to said vario-losser in such direction as to cause its loss value to be reduced, said disabling circuit branch comprising means for deriving a second voltage from the speech frequencies in said electrical wave in the higher frequency region in which the unvoiced sounds have substantially constant energy, and for applying said second voltage as a bias to said vario-losser in such direction as to cause its loss to be increased, the constants of said vario-losser, said enabling circuit branch and said disabling circuit branch being selected so that for voiced sound inputs to said frequency counter, the resultant bias on said vario-losser causes the loss thereof to be sufficiently low to enable operation of said frequency counter by the applied waves, and for unvoiced sound inputs only to said frequency counter, the resultant bias on said vario-losser causes the loss thereof to be sufficiently high to prevent operation of said frequency counter by the applied waves.

References Cited by the Examiner

UNITED STATES PATENTS

| | | | |
|---|---|---|---|
| 2,260,933 | 10/41 | Cooper | 324—78 |
| 2,325,927 | 8/43 | Wilbur | 324—70 |
| 2,366,076 | 12/44 | Wilbur | 324—78 |

OTHER REFERENCES

Article by Lenihan, "Pulse Generation" in Electronic Engineering, March 1944, pp. 408—411.

ROBERT H. ROSE, *Primary Examiner.*

OTTO B. ROEPKE, CHARLES J. SPENCER, SAM BERNSTEIN, DAVID J. GALVIN, LEO QUACKENBUSH, JAMES E. KEELY, NEWTON N. LOVEWELL, *Examiners.*